United States Patent [19]

Oikawa

[11] Patent Number: 5,434,677
[45] Date of Patent: Jul. 18, 1995

[54] DIGITAL VIDEO SIGNAL REPRODUCING APPARATUS WITH HIGH-SPEED PLAY MODE

[75] Inventor: Yuka Oikawa, Chiba, Japan

[73] Assignee: Sony Corporation, Tokyo, Japan

[21] Appl. No.: 172,197

[22] Filed: Dec. 23, 1993

[30] Foreign Application Priority Data

Dec. 25, 1992 [JP] Japan ............... 4-359522
Feb. 22, 1993 [JP] Japan ............... 5-056576

[51] Int. Cl.$^6$ ........................... H04N 5/783
[52] U.S. Cl. ........................... 358/335; 358/312; 360/10.1
[58] Field of Search ............. 358/335, 312, 310; 360/10.1, 32, 36.1, 33.1, 73.05; H04N 5/783

[56] References Cited

U.S. PATENT DOCUMENTS

| | | | |
|---|---|---|---|
| 4,887,169 | 12/1989 | Bannai et al. | 358/312 |
| 5,065,259 | 11/1991 | Kubota et al. | 358/335 |
| 5,301,070 | 4/1994 | Tanaka | 360/10.1 |

FOREIGN PATENT DOCUMENTS

| | | |
|---|---|---|
| 364986 | 4/1990 | European Pat. Off. |
| 471118 | 2/1992 | European Pat. Off. |
| 509594 | 10/1992 | European Pat. Off. |

OTHER PUBLICATIONS

IEEE Transactions On Consumer Electronics, vol. 37, No. 3, Aug. 1991, New York US pp. 244–251, XP263192 Inoue et al. 'New method for variable speed playback for high definition VCRs' p. 245, left column, line 11–line 14 p. 245, right column, line 30–line 51.

*Primary Examiner*—Tommy P. Chin
*Assistant Examiner*—Huy Nguyen
*Attorney, Agent, or Firm*—William S. Frommer; Alvin Sinderbrand

[57] ABSTRACT

Apparatus for reproducing digital video signals from a magnetic tape, wherein a frame of digital video signals had been recorded in 2 m tracks (m is an integer greater than 1), in which a pair of rotary heads having respectively different azimuth angles scan traces across the magnetic tape, such traces substantially coinciding with the tracks when the magnetic tape is transported at a speed equal to the recording speed. The magnetic tape is transported at a high speed equal to $(m \times n \pm l)$ times the recording speed, where n is an integer greater than 0, $l=0.5$ when the pair of heads are arranged as a double azimuth head assembly and $l=0.25$ when the heads are angularly separated by 180°.

20 Claims, 19 Drawing Sheets

Data obtained from First Frame
Data obtained from Second Frame
Data obtained from Third Frame
Data obtained from Fourth Frame

| A0 | A1 | A2 | A3 | | |
|---|---|---|---|---|---|
| B0 | B1 | B2 | B3 | A4 | |
| A8 | A7 | A6 | A5 | B4 | |
| B8 | B7 | B6 | B5 | | |
| A9 | A10 | A11 | A12 | | |
| B9 | B10 | B11 | B12 | A13 | |
| A17 | A16 | A15 | A14 | B13 | |
| B17 | B16 | B15 | B14 | | |
| A18 | A19 | A20 | A21 | | |
| B18 | B19 | B20 | B21 | A22 | |
| A26 | A25 | A24 | A23 | B22 | |
| B26 | B25 | B24 | B23 | | |

(b)

| A0 | B0 | A1 | B1 | A2 | B2 | A3 | B3 | A4 |
|---|---|---|---|---|---|---|---|---|
| B8 | A8 | B7 | A7 | B6 | A6 | B5 | A5 | B4 |
| A9 | B9 | A10 | B10 | A11 | B11 | A12 | B12 | A13 |
| B17 | A17 | B16 | A16 | B15 | A15 | B14 | A14 | B13 |
| A18 | B18 | A19 | B19 | A20 | B20 | A21 | B21 | A22 |
| B26 | A26 | B25 | A25 | B24 | A24 | B23 | A23 | B22 |

(c)

FIG. 10
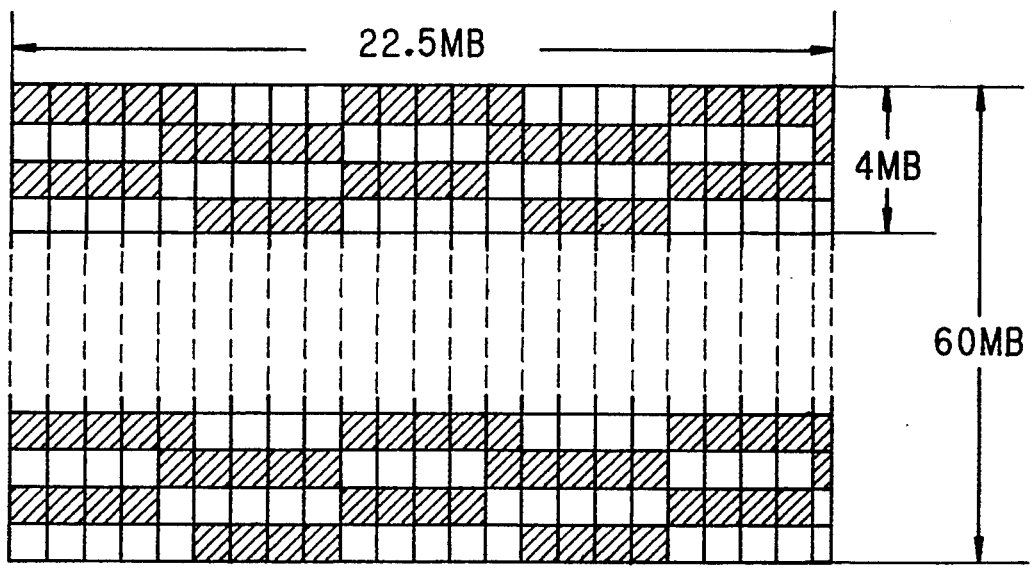
 Data recorded on odd-number tracks of Odd Frames (even-number tracks of even frames)
 Data recorded on even-number tracks of Even Frames (odd-number tracks of odd frames)

▬ Data obtained from First Frame
▦ Data obtained from Second Frame
░ Data obtained from Third Frame
▦ Data obtained from Fourth Frame Data obtained from First Frame
Data obtained from Second Frame
Data obtained from Third Frame
Data obtained from Fourth Frame
Data obtained from Fifth Frame

| A0 | B0 | A1 | B1 | A2 | B2 | A3 | B3 | A4 |
| --- | --- | --- | --- | --- | --- | --- | --- | --- |
| B8 | A8 | B7 | A7 | B6 | A6 | B5 | A5 | B4 |
| A9 | B9 | A10 | B10 | A11 | B11 | A12 | B12 | A13 |
| B17 | A17 | B16 | A16 | B15 | A15 | B14 | A14 | B13 |
| A18 | B18 | A19 | B19 | A20 | B20 | A21 | B21 | A22 |
| B26 | A26 | B25 | A25 | B24 | A24 | B23 | A23 | B22 |

| 0 | 6 | 10 | 2 | 8 |
| --- | --- | --- | --- | --- |
| 2 | 8 | 0 | 4 | 10 |
| 4 | 10 | 2 | 6 | 0 |
| 6 | 0 | 4 | 8 | 2 |
| 8 | 2 | 6 | 10 | 4 |
| 10 | 4 | 8 | 0 | 6 |

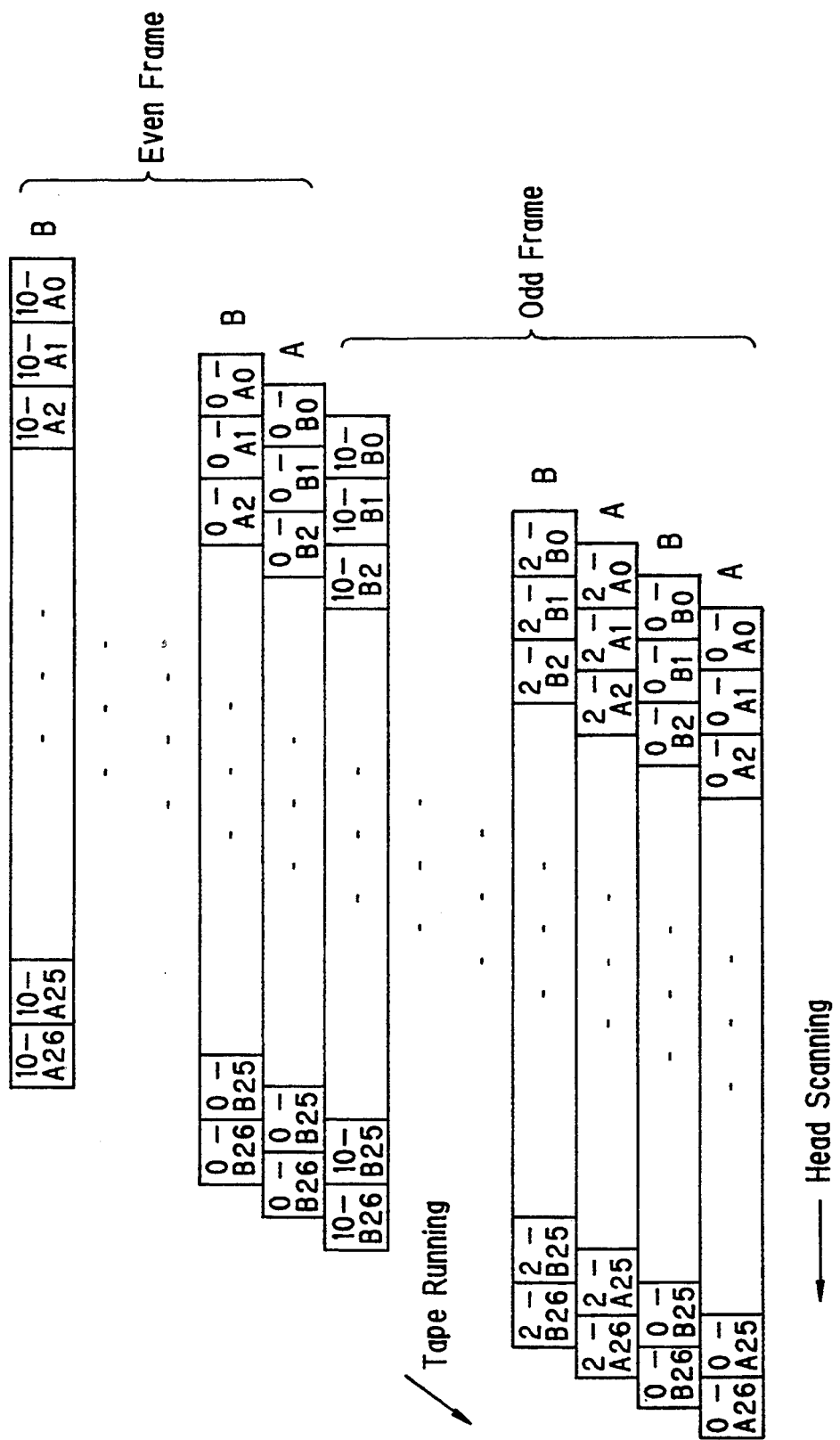

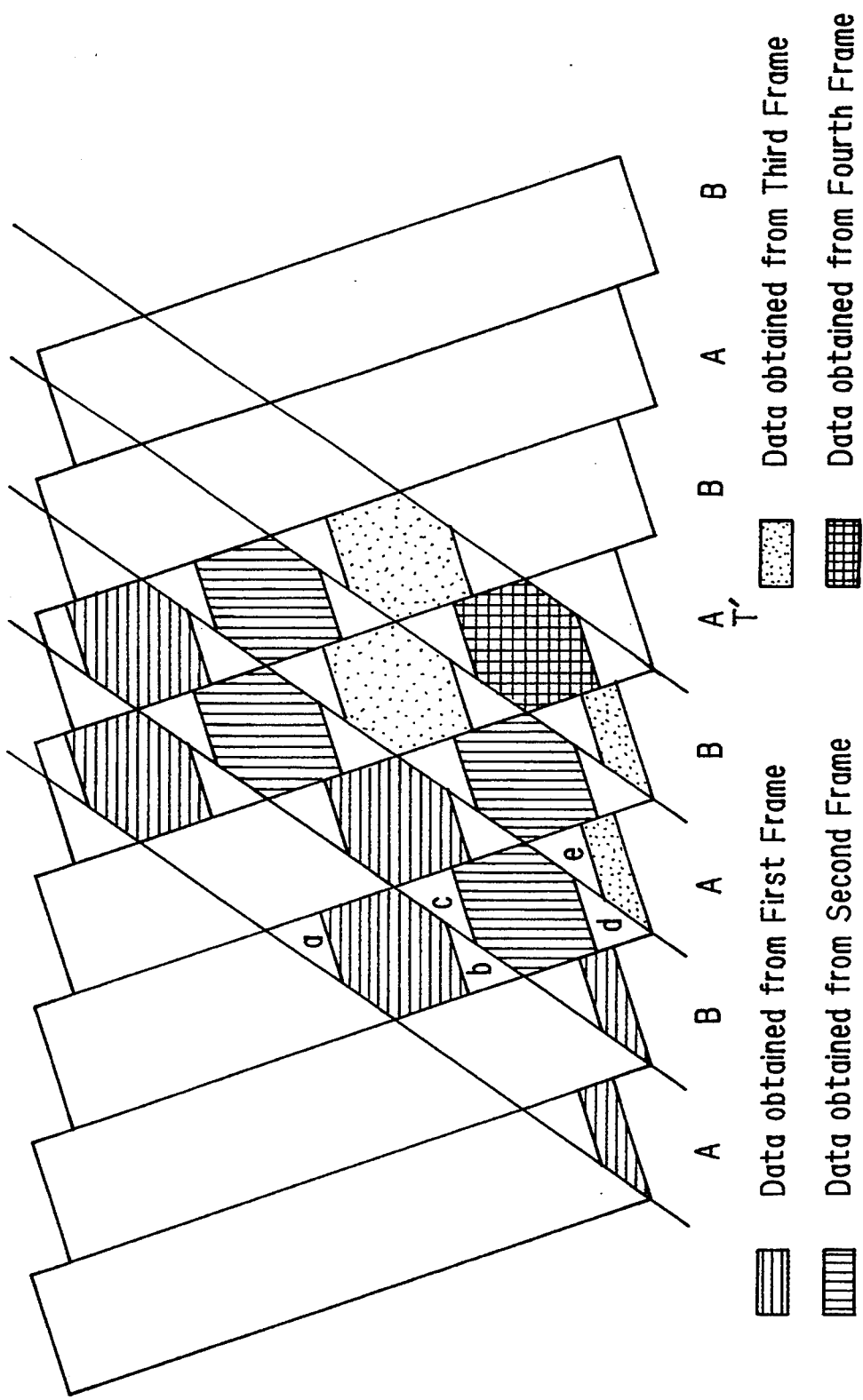

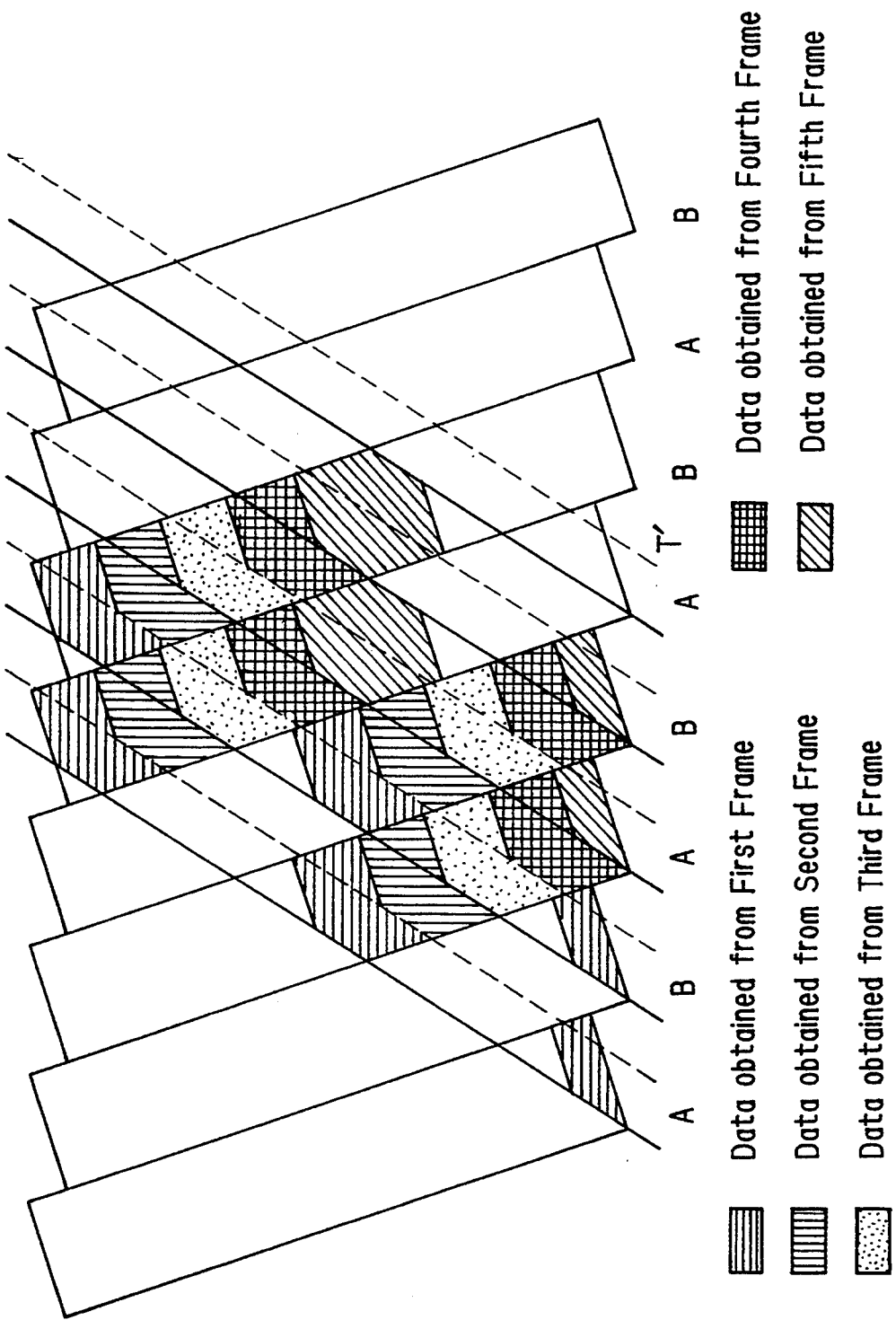

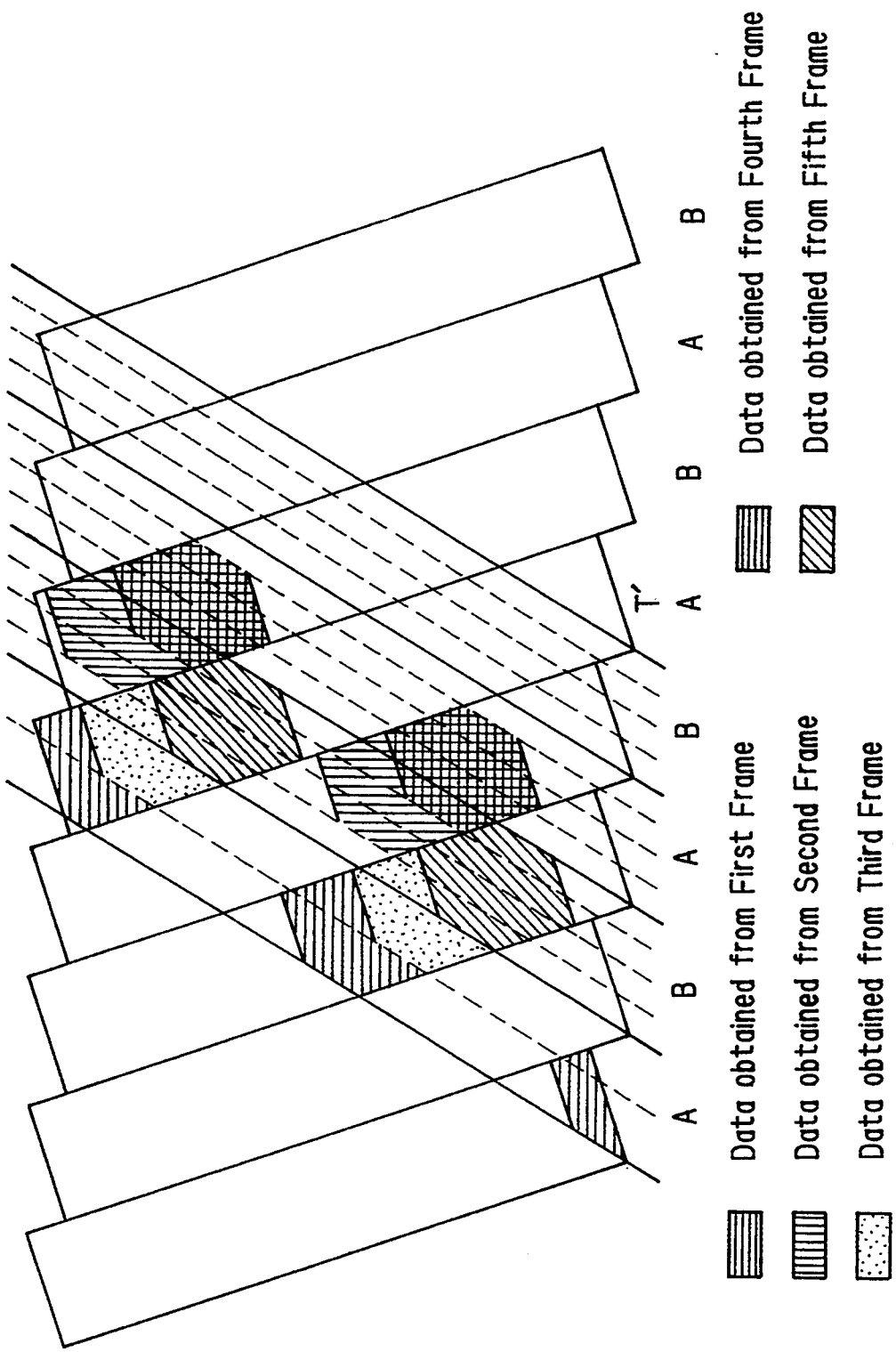

DIGITAL VIDEO SIGNAL REPRODUCING APPARATUS WITH HIGH-SPEED PLAY MODE

BACKGROUND OF THE INVENTION

This invention relates to digital video signal reproducing apparatus and, more particularly, to such apparatus which is capable of reproducing digital video signals at a high speed, thereby providing a high speed play mode, from which a natural looking image may be displayed.

Both analog and digital video recorders are known to record a frame of video signals in a plurality of slant tracks on a magnetic tape. For example, in an analog 8 mm video recorder, one video frame is recorded in two tracks. In a digital video recorder of the type known as the D-2 format, one frame of digital video signals is recorded in 12 slant tracks. Still further, a digital video recorder for consumer use has been proposed, wherein one frame of an NTSC video signal is digitized and recorded in 10 tracks and one frame of a PAL video signal is digitized and recorded in 12 tracks.

In analog and digital video playback devices, such as a video recorder exhibiting a reproducing mode, the previously recorded video signals may be reproduced in both a "normal" playback mode and in "special" playback modes. In the normal mode, the video tape is transported at a playback speed substantially equal to the speed at which it was driven during a recording operation and, as a result, the heads scan traces which substantially coincide with the previously recorded tracks. However, in a special playback mode, such as in a high speed playback mode, the tape is transported at a much higher speed than the speed at which it was driven during a recording operation and, consequently, each head of the video recorder then scans a portion of each of several tracks. Hence, the resultant image which is reproduced from the data recovered from portions of respective tracks appears as a synthesized display which is perceived as an unnatural image which may be difficult to view.

OBJECTS OF THE INVENTION

Therefore, it is an object of the present invention to provide digital video signal reproducing apparatus which reproduces at a high speed digital video signals that had previously been recorded on a magnetic tape, resulting in a video display which appears as a natural image.

Another object of this invention is to provide apparatus of the aforenoted type in which the magnetic tape is transported at predetermined high playback speeds directly related to the head structure of the reproducing apparatus, the number of tracks in which a frame of the digital video signal is recorded and the data read-out rate exhibited by the apparatus.

Various other objects, advantages and features of the present invention will become readily apparent from the ensuing detailed description, and the novel features will be particularly pointed out in the appended claims.

SUMMARY OF THE INVENTION

As one aspect of the present invention, apparatus is provided for reproducing digital video signals from a magnetic tape wherein a frame of digital video signals had been recorded in 2m tracks (m is an integer greater than 1). A pair of rotary heads having respectively different azimuth angles scan traces across the magnetic tape, these traces substantially coinciding with the record tracks when the magnetic tape is transported at a playback speed substantially equal to the transport speed used to record the digital video signals. The tape is transported at a playback speed equal to $(m \times n \pm l)$ times the recording speed, where n is an integer other than zero, $l=0.5$ when the heads are arranged as a double azimuth head assembly and $l=0.25$ when the heads are angularly separated by 180°.

As another aspect of this invention, each frame of digital video signals is recorded as a multiple of blocks of picture elements, the blocks of a frame being recorded in shuffled form with respect to each other. If the heads are arranged as a double azimuth head assembly, $l=0.5$ if the data read-out rate of the reproducing apparatus is at least 50% and $l=0.25$ if the data read-out rate is less than 50%. Alternatively, if the heads are angularly separated from each other by 180°, n is an odd integer and $l=0.25$ if the data read-out rate is at least 50% and $l=0.125$ if the data read-out rate is less than 50%.

As a feature of this invention, n is a positive number when the tape is transported in a forward direction or a fast forward playback mode; and n is a negative number when the tape is transported in the reverse direction or a fast reverse playback mode.

As another feature of this invention, if the digital video signals are derived from NTSC television signals, $m=5$. If the digital video signals are derived from PAL television signals, $m=6$.

As yet another feature of this invention, the frame of digital video signals are recorded as orthogonally transformed video signals, such as video signals that had been subjected to discrete cosine transformation, and are encoded in a variable length code, such as a two-dimension Huffman code.

As a result of the present invention, each head picks up digital video data from a portion of each of multiple tracks scanned by that head during the fast playback operation; and when such picked up portions are assembled in a composite form, they emulate the original record tracks having respective portions from different frames contiguous to each other. That is, a portion of a video signal in one track in one frame is linked to (or abuts) an adjacent portion of a video signal in another track in a different frame. As a result of this linked video data, the resultant image displayed therefrom appears as a natural-looking image.

BRIEF DESCRIPTION OF THE DRAWINGS

The following detailed description, given by way of example and not intended to limit the present invention solely thereto, will best be understood in conjunction with the accompanying drawings in which:

FIG. 10 schematically illustrates the relationship of the shuffled macro blocks of a frame as recorded in successive tracks;

FIG. 17 schematically illustrates the track pattern formed by the shuffling operation shown in FIGS. 16A-16C;

FIG. 18 is a composite reconstruction of the data picked up by the heads of FIG. 4 during a high speed playback operation in the event that the data read-out rate of the reproducing apparatus is less than 50%;

FIG. 19 is a composite reconstruction similar to FIG. 18 which avoids the drawbacks of FIG. 18 by changing the transport speed at which the video tape is driven for a high speed playback operation; and FIG. 20 is a composite reconstruction of the data picked up by the heads shown in FIG. 2 when the data read-out rate is less than 50%, but the transport speed of the magnetic tape is varied during the high speed playback operation to avoid disadvantages of the type shown in FIG. 18.

DETAILED DESCRIPTION OF PREFERRED EMBODIMENTS

Figure 1:
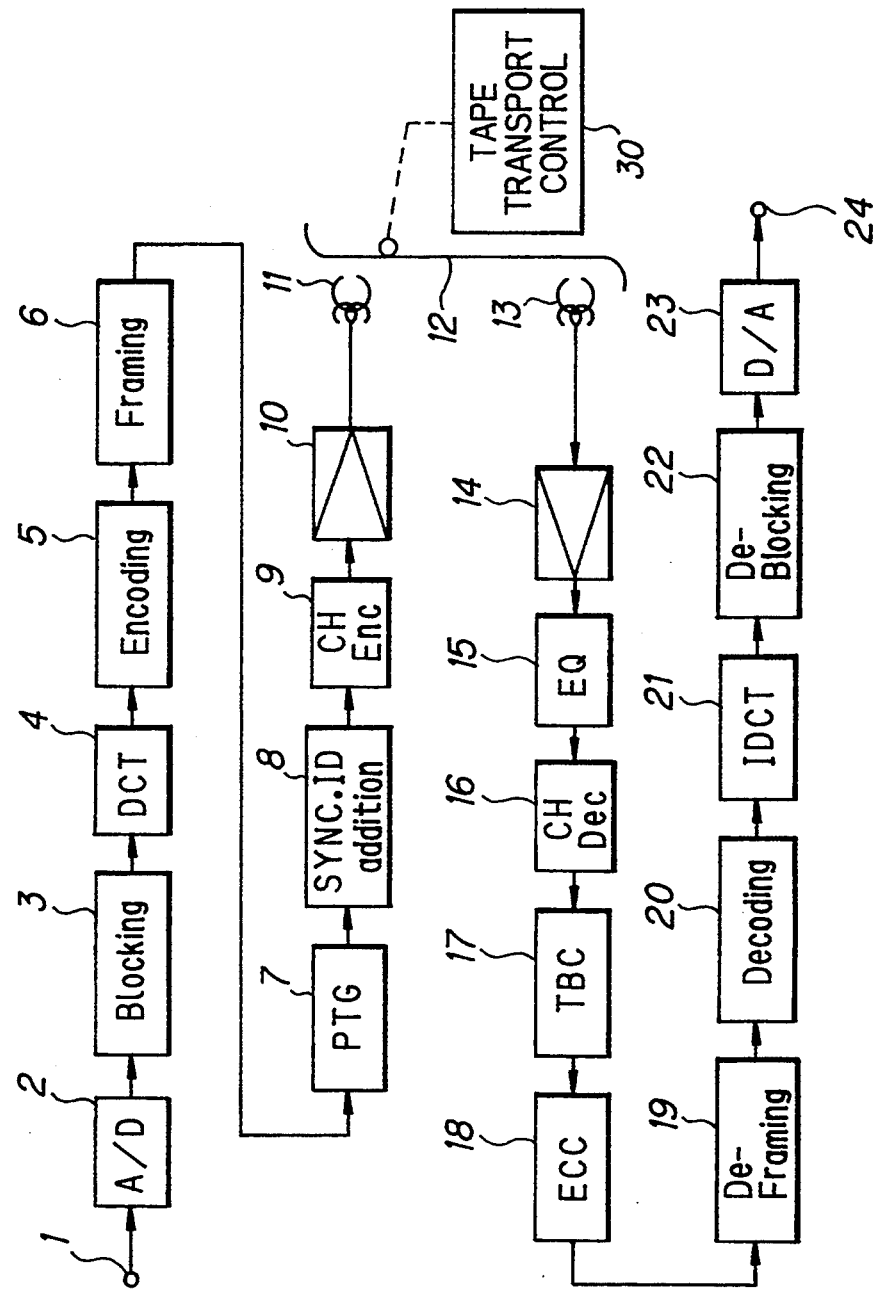
FIG. 1 is a block diagram of video signal recording and reproducing apparatus in which the present invention finds ready application.

Referring now to the drawings, FIG. 1 is a block diagram of apparatus including a recording section for recording digital video signals on a magnetic tape 12 and a reproducing section for reproducing those digital video signals at relatively high playback speeds. The recording section includes an analog-to-digital converter 2 for receiving the video signal supplied thereto from an input terminal 1 and digitizing those video signals. As will be described, the recording section is adapted to record either NTSC or PAL video signals.

The digitized video signals, which constitute a frame of video samples, or picture elements (pixels), are assembled into blocks of data units, each unit being comprised of an $8 \times 8$ array of video samples, by a blocking circuit 3. The blocking circuit also is adapted to shuffle the data blocks, as will be described, and to subject the shuffled blocks to luminance/chrominance (Y/C) multiplexing, as is known to those of ordinary skill in the art. In particular, the luminance and chrominance components are processed separately and then combined to form what is referred to herein as a macro block (MB).

The shuffled data blocks are supplied from blocking circuit 3 to an orthogonal transform circuit 4 whereat each $8 \times 8$ array is subjected to orthogonal transformation. In the preferred embodiment, such orthogonal transformation is in the form of discrete cosine transformation wherein data originally in the time domain is converted to data in the frequency domain. The orthogonally transformed data is quantized in accordance with a selectively changeable quantizing step and then encoded in a variable length code by encoding circuit 5. Preferably, the variable length code is a two-dimension Huffman code. Although each orthogonally-transformed data block may exhibit variable lengths, the overall data length of a number of such blocks is fixed. For example, the overall data length of 30 orthogonally transformed (or DTC) blocks is fixed.

A framing circuit 6 is coupled to encoding circuit 5 to receive the variable length coded data therefrom and is adapted to form data frames suitable for error correction coding (ECC). The data frames then are supplied to a parity generator 7 whereat parity data is added thereto. The output of the parity generator is coupled to a sync/ID adding circuit 8 which operates to add a synchronizing code and identifying data signals to the data frames. Then, the data produced at the output of the sync/ID adder circuit is supplied to a channel encoder 9 whereat the data is subjected to parallel-to-serial conversion and suitable modulation and encoding well known for recording on magnetic media. The channel encoded data is supplied to a rotary magnetic head assembly 11 via a recording amplifier 10 for recording in successive slant tracks on magnetic tape 12. The tape is transported at a suitable recording transport speed by a tape transport control circuit 30; and each frame of digital video signals is recorded in a multiple of tracks. For example, if the video signal supplied to input terminal 1 is an NTSC signal, one frame of the digitized NTSC signal is recorded in 10 tracks. If the input video signal is a PAL signal, one frame is recorded in 12 tracks. And if the input video signal is a high definition television (HDTV) signal, one frame is recorded in 20 tracks.

The reproducing section of the apparatus shown in FIG. 1 functions in a manner generally complementary to the recording section just described. The digital video signals recorded in slant tracks on magnetic tape 12 are reproduced by rotary magnetic head assembly 13 which, preferably, is of the same construction as rotary magnetic head assembly 11. The reproduced signals are supplied to an equalizer 15 by a playback amplifier 14, whereby the waveform of the reproduced signal is equalized. Then, the equalized video signals are supplied to a channel decoder 16 which operates in a manner complementary to channel encoder 9, thereby demodulating and decoding the digital video signals and recovering the form thereof as had been supplied to the input of channel encoder 9 during a recording operation.

The digital video signals produced at the output of channel decoder 16 are supplied to a timebase correction circuit 17 for correcting timebase errors that may be introduced during the reproducing operation. The timebase corrected digital video signal then is subjected to error correction processing by ECC circuit 18, and the error-corrected digital video signals are supplied to a deframing circuit 19 to separate the data frames and thereby recover the variable length coded video data.

A decoding circuit 20 is coupled to the output of deframing circuit 19 to decode the variable length coded video data and also to perform an inverse quantization operation so as to restore the video data to substantially the same form as had been presented to encoding circuit 5 during a recording operation. An inverse discrete cosine transformation circuit (IDCT circuit) 21 carries out an inverse orthogonal transformation operation on the decoded, inverse quantized data supplied thereto. Hence, data blocks, each formed of an 8×8 array of picture samples are recovered and supplied to a deblocking circuit 22 which deshuffles the data blocks and separates the luminance and chrominance components, thus providing separate digital luminance data and digital chrominance data. A digital-to-analog converter 23 is coupled to deblocking circuit 22 to receive the separated digital luminance and digital chrominance components and to convert those components to analog form. The resultant analog component video signal is supplied to an output terminal 24.

Magnetic tape 12 is driven by a suitable tape drive motor (not shown) controlled by tape transport control 30. For a "normal" playback operation, tape transport control 30 controls the speed at which tape 12 is transported so as to be substantially equal to the tape transport speed during a recording operation. However, for special playback operations, such as a fast forward playback operation or a fast reverse playback operation, tape 12 is driven under the control of tape transport control 30 at a transport speed substantially greater than the speed at which the tape was driven during a recording operation. The particular speed at which the tape is driven to produce a natural image when the digital video signal is reproduced at a relatively high speed is discussed below.

Figure 2:
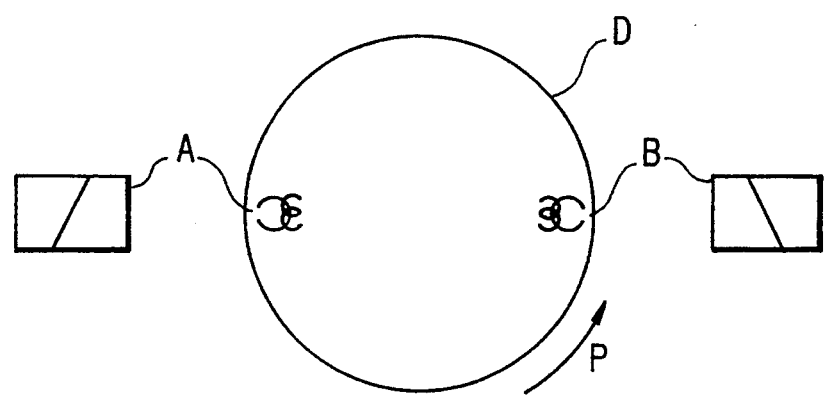
FIG. 2 is a schematic representation of one example of rotary magnetic heads used in the recording and reproducing apparatus of FIG. 1.

One embodiment of the magnetic head assembly which may be used for recording heads 11 or reproducing heads 13 is illustrated in FIG. 2. Heads A and B are mounted on a rotary drum D and are spaced apart from each other by an angular distance of 180°. It is seen that heads A and B exhibit different azimuth angles such that when signals which were recorded by, for example, head A are reproduced by head B, the phenomenon of azimuth loss minimizes the amplitude of such reproduced signals. Hence, azimuth loss is relied upon to minimize cross-talk pickup when, for example, head A scans a track during a reproducing operation that previously had been recorded by head A and picks up cross-talk components from adjacent tracks that had been recorded by head B.

When the head assembly shown in FIG. 2 is used, magnetic tape 12 is deployed about drum D by an angular amount of approximately 180° such that, with each rotation of the drum, heads A and B scan successive traces, or tracks, across the tape. As is known, tape 12 is driven about the periphery of drum D at an angle to the longitudinal axis of the drum.

Figure 3:
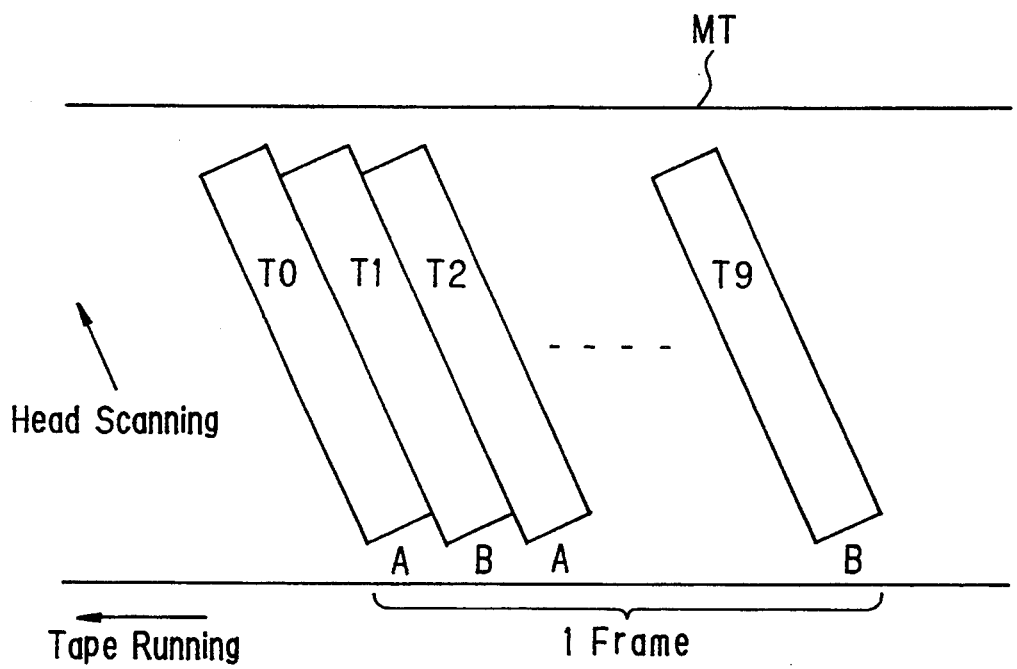
FIG. 3 is a schematic representation of the track pattern formed by the recording apparatus shown in FIG. 1.

FIG. 3 schematically illustrates the track pattern formed by heads A and B of FIG. 2 when recording digital video signals on tape 12. Here, it is assumed that the video signal is an NTSC signal and one frame is recorded in 10 tracks T0, T1, ... T9. It is assumed that head A of FIG. 2 records even tracks T0, T2, T4, ... and head B records odd tracks T1, T3, ... T9. Magnetic tape MT is driven from right-to-left in FIG. 3 and heads A and B scan alternate tracks in the direction indicated by the head scanning arrow.

Figure 4:
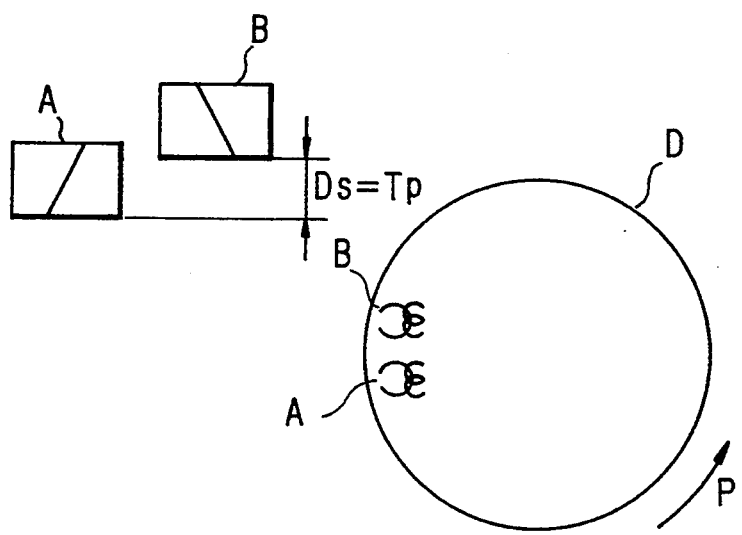
FIG. 4 is a schematic representation of another example of the rotary magnetic heads that may be used by the apparatus shown in FIG. 1.

FIG. 4 schematically illustrates another embodiment of the magnetic head assembly of which recording heads 11 and reproducing heads 13 may be constructed. The embodiment shown in FIG. 4 is referred to herein as a "double azimuth head assembly" wherein heads A and B are disposed in a common support, spaced from each other by a very small angular amount and exhibit a step relationship, whereby head B is displaced from head A in a direction parallel to the longitudinal axis of drum D by an amount $D_s$. Heads A and B are mounted on drum D and rotate to scan adjacent tracks simultaneously. It is appreciated that the displacement $D_s$ of heads A and B defines the track pitch $T_p$ of such adjacent tracks.

Heads A and B exhibit respectively different azimuth angles for the same reason as mentioned hereinabove with respect to FIG. 2. It is recognized that, during recording, digital video signals are supplied simultaneously to heads A and B for simultaneous recording in adjacent tracks. The magnetic tape is deployed about the periphery of drum D by an amount substantially greater than 180° and, preferably, greater than 300°. The recording of simultaneous tracks by the head assembly shown in FIG. 4 is known to those of ordinary skill in the art.

Figure 5:
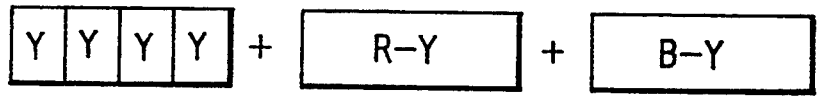
FIGS. 5A-5C schematically represent the manner in which blocks of picture elements are formed of samples which constitute a frame of a video image.

Referring to FIG. 5A, there is illustrated the manner in which the digital video samples, or pixels, of the luminance component Y are arranged into data blocks, each comprised of an 8×8 array of pixels. In an NTSC frame, 720 samples in a horizontal line and 480 samples in the vertical direction are provided. It is appreciated, then, that an array of 90×60 data blocks constitute a frame of luminance samples.

In addition to the luminance component, the video signal is comprised of a red color difference component R-Y and a blue color difference component B-Y. As is typical in digital video recording, a suitable video display is provided if the number of samples of the color difference component is one-fourth the number of samples of the luminance component. FIG. 5B illustrates the data blocks of R-Y and B-Y samples, each data block being comprised of an 8×8 array, and the number of the data blocks included in a frame is seen to be a 22.5×60 array of color difference data blocks. That is, the blocks of color difference samples are arranged in 60 rows of color difference data blocks, with each row consisting of 22.5 data blocks.

FIG. 5C illustrates the construction of a macro block, and it is seen that each macro block is formed of four luminance data blocks, one R-Y data block and one B-Y data block. This construction is known as the 4:1:1 arrangement, for obvious reasons.

Figure 6:
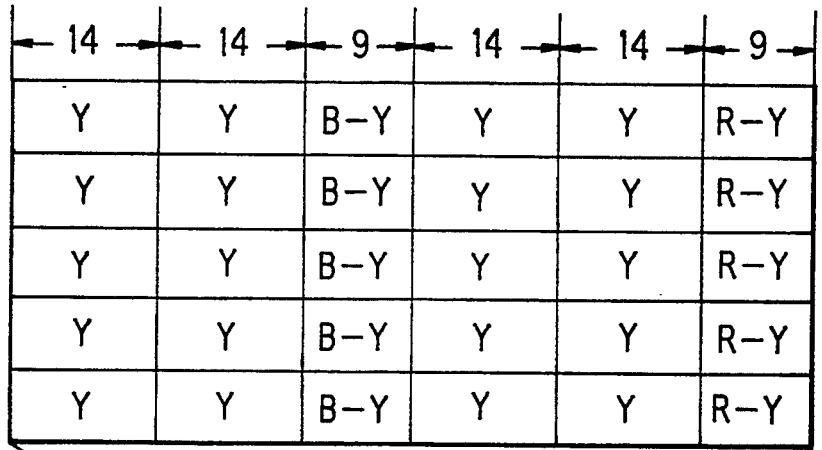
FIGS. 6A and 6B illustrate the manner in which a group of macro blocks is formed when an NTSC video signal is divided into blocks of picture elements.
Figure 6:
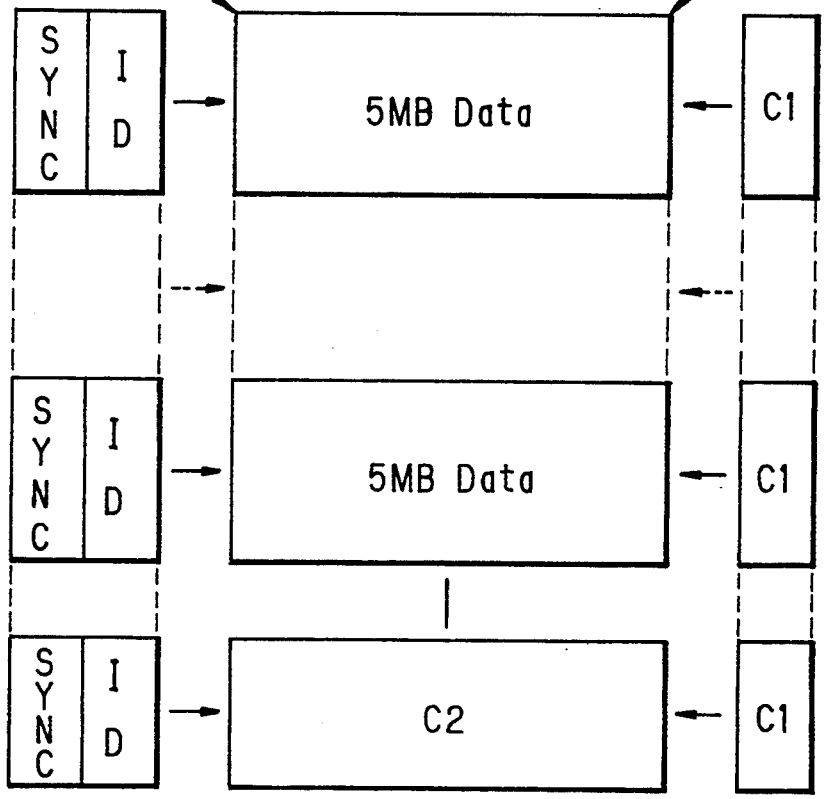

Each luminance and color difference data block is subjected to orthogonal transformation, preferably discrete cosine transformation, in DCT circuit 4, quantized and variable length encoded in encoding circuit 5. Thirty of these resultant transform, quantized and variable length coded data blocks constitute a data frame, and FIG. 6A schematically illustrates a frame formed of five macro blocks, each macro block having the format schematically shown in FIG. 5C. As an example, each transformed, quantized and variable length encoded luminance data block is comprised of 14 bytes and each color difference data block is comprised of 9 bytes. Although not shown herein, the 14 bytes of a luminance data block includes motion information of the orthogonally transformed data as well as information representing the amount of high frequency components included in the orthogonally transformed data block. Likewise, the 9 bytes included in the color difference data block includes information representing the motion of the orthogonally transformed data and information representing the amount of high frequency components included in the orthogonally transformed data block. Each data block also includes information representing the quantizing step used to quantize the luminance and color difference data in that block.

As mentioned above, although each data block exhibits a variable data length by reason of the variable length coding thereof, the overall length of the data included in 30 data blocks is fixed. From FIG. 5C it is seen that 6 data blocks constitute one macro block and 5 macro blocks constitute one data frame formed by framing circuit 6. From FIG. 6B, it is seen that horizontal parity C1 is added to each data frame by parity generator 7 and a synchronizing code and identification data are added to each frame by sync/ID adder circuit 8. Parity generator 7 also adds vertical parity data C2, as shown in FIG. 6B.

Figure 7:
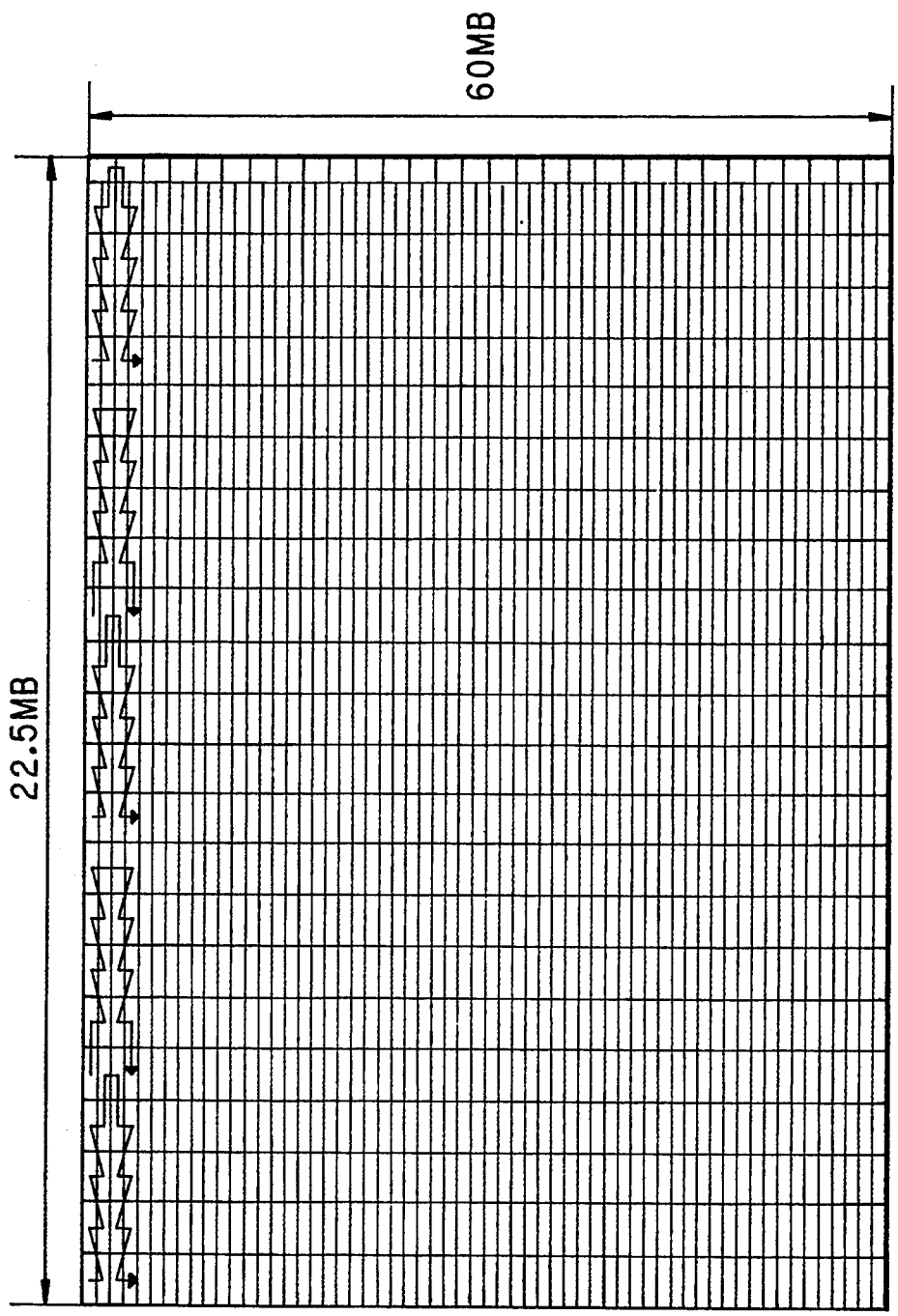
FIG. 7 schematically illustrates the manner in which the macro blocks which constitute a frame of a video signal are shuffled prior to recording.

From FIGS. 5A and 5C, it is appreciated that a frame of digital video signals is formed of a 22.5×60 array of macro blocks. This array is shown in FIG. 7. A group of macro blocks consisting of, for example, 18 macro blocks, is selected as represented by the arrows shown in FIG. 7. FIG. 8A illustrates this group of 18 macro blocks and, for purposes of identification, these 18 macro blocks are identified as blocks A0, A1, . . . A4, B0, B1, . . . B4, A5, . . . A8, B5, . . . B8. Another group of 18 macro blocks, this one located vertically beneath the first-mentioned group, is seen to be formed of macro blocks A9, A10 . . . A13, B9, B10 . . . B13, A14 . . . A17, B14 . . . B17. A third group of 18 macro blocks, this one located beneath the aforementioned second group in FIG. 7, is illustrated in FIG. 8A as being comprised of macro blocks A18, A19 . . . A22, B18, B19, . . . B22, A23 . . . A26, B23 . . . B26.

As also shown in FIG. 7, other groups of 18 macro blocks are formed horizontally adjacent the three groups discussed above. It is seen that the respective groups of macro blocks which are arranged horizontally in the pattern shown in FIG. 7 appear to dovetail with each other. Accordingly, five groups of macro blocks are selected in the horizontal direction and fifteen groups of macro blocks are selected in the vertical direction, with each group being comprised of 18 macro blocks.

The three groups of macro blocks shown in FIG. 8A, which consist of 54 macro blocks, are arranged in a 9×6 array, as shown in FIG. 8B. Simply for purposes of identification, the pattern shown in FIG. 8B for these three groups of macro blocks is identified as sub-area 0. The next three groups of macro blocks which are vertically disposed directly beneath the three groups shown in FIG. 8A are arranged in a pattern similar to that shown in FIG. 8B, and this pattern is identified as sub-area 2. Succeeding patterns of macro blocks, each formed of three groups are arranged in the manner shown in FIG. 8B and are identified as sub-areas 4, 6 and 8. Then, this process is repeated for the next groups of macro blocks disposed to the right of the macro blocks just discussed, and these successive patterns are shown in FIG. 8C and are identified as sub-areas 4, 6, 8, 0 and 2, respectively. The remaining groups of macro blocks included in the frame shown in FIG. 7 are arranged in the pattern shown in FIG. 8B, one atop the other as shown in FIG. 8C, and are identified by the sub-area reference numerals which are illustrated in FIG. 8C. From FIG. 8B, it is seen that each sub-area is formed as a 9×6 array, and each array is identified with one of five different sub-area reference numerals 0, 2, 4, 6 and 8. These reference numerals are used for shuffling, as will now be described.

Figure 9:
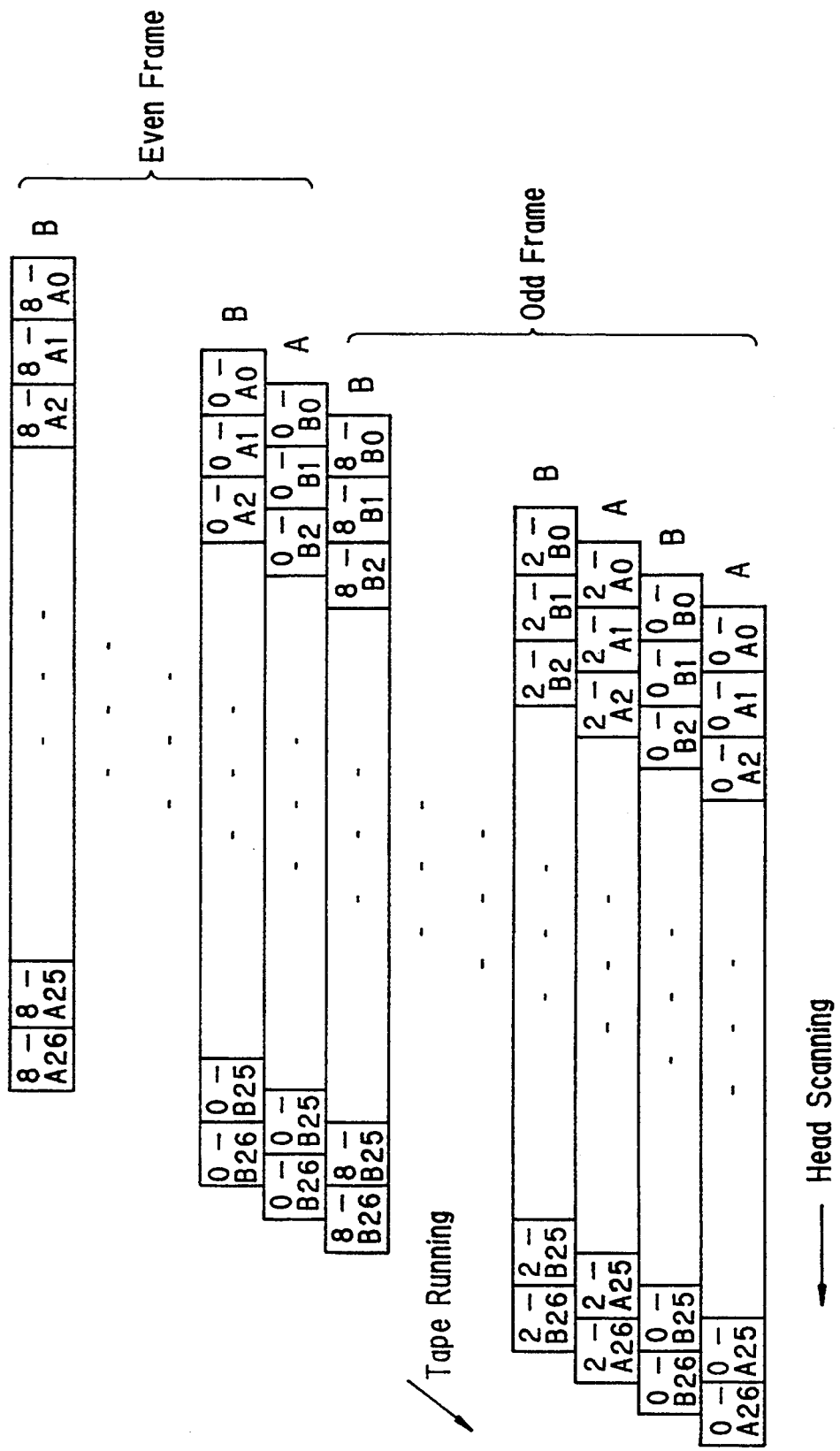
FIG. 9 schematically illustrates the track pattern formed by the shuffling operation shown in FIGS. 8A-8C.

FIG. 9 illustrates the patterns of macro blocks which are recorded in each track. In the NTSC system, ten tracks constitute a frame; and as shown in FIG. 9, odd frames and even frames of video data alternate. The head scanning direction and the tape movement direction are illustrated by respective arrows, resulting in tracks which are successively formed from the bottom to the top of FIG. 9. Each track identified as track A is recorded by head A and each track identified as track B is recorded by head B. It is recalled that these heads exhibit different azimuth angles and may be spaced apart by 180° (as shown in FIG. 2) or may be formed as a double azimuth head assembly (as shown in FIG. 4).

Each track is divided into 27 portions and each portion has recorded therein five macro blocks. FIG. 9 illustrates each portion as being identified by two identifiers, a numeral followed by a letter and numeral combination. For example, in the odd frame, tracks A, B, A, B, A, B, etc. are divided into portions 0-A0, 0-A1, . . . 0-A26; 0-B0, 0-B1, . . . 0-B26; 2-A0, 2-A1, . . . 2-A26; . . . 8-B0, 8-B1, . . . 8-B26. Portion 0-A0 of the first track A is formed of the macro blocks A0 in each of the five sub-areas of FIG. 8C identified as sub-area 0. These five macro blocks are selected in the following order: macro block A0 in sub-area 0 in the middle column of FIG. 8C, followed by macro block A0 in sub-area 0 in the column to the right of the middle column, followed by macro block A0 in sub-area 0 in the column to the left of the middle column, followed by macro block A0 in sub-area 0 in the right-most column, followed by macro block A0 in sub-area 0 in the left-most column.

The next portion 0-A1 in the first track A is formed of five macro blocks A1 selected from each sub-area 0 in the pattern shown in FIG. 8C. Thus, macro block A1 from sub-area 0 in the middle column is followed by macro block A1 in sub-area 0 to the right of the middle column, followed by macro block A1 from sub-area 0 in the column to the left of the middle column, followed by macro block A1 from sub-area 0 in the right-most column, followed by macro block A1 from sub-area 0 in the left-most column. This selection of macro blocks A0, A1, A2, . . . A26 from sub-area 0 continues, thus forming the first track A.

Next adjacent track B is formed of macro blocks B0, B1, B26 selected from each sub-area 0 in the pattern shown in FIG. 8C in the same manner as macro blocks A0-A26 were selected from sub-areas 0. This selection operation continues, thus forming the ten tracks which may be identified as A0, B0, A2, B2, . . . A8, B8. Thus, the frame of macro blocks shown in FIG. 7 is recorded on successive tracks in shuffled form, as just described.

It is seen that each track thus is formed of 27×5=135 macro blocks. As seen from FIG. 9, the order of the macro blocks formed in tracks A, B, A, etc. in an odd frame (macro blocks A are recorded in tracks A and macro blocks B are recorded in tracks B) is interchanged in an even frame, wherein macro blocks B are recorded in tracks A and macro blocks A are recorded in tracks B. Nevertheless, the macro block identification remains the same as that shown in FIGS. 8A and 8B.

Figure 8:
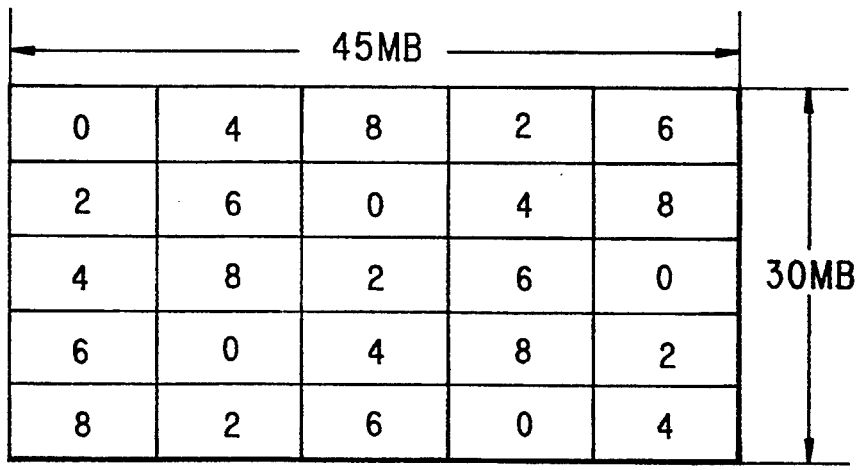
FIGS. 8A-8C illustrate in greater detail the shuffling operation for an NTSC video signal.

As a result of the shuffling shown in FIGS. 7-9, macro blocks which are vertically adjacent each other in the video frame, as shown in FIGS. 7 and 8A, are recorded in adjacent tracks. Also, those macro blocks which are recorded in odd tracks (e.g. tracks B) in an odd frame are recorded in even tracks (e.g. tracks A) in an even frame. This is shown in FIG. 9, wherein macro blocks B are recorded in odd tracks B in the odd frame, yet macro blocks B are recorded in even tracks A in the even frame. Still further, fire macro blocks (for example) which are horizontally adjacent each other in the video frame, as shown in FIGS. 7 and 8A, are recorded in a track and the next five macro blocks are recorded in another track, and so on. The foregoing is represented by FIG. 10.

Shuffling in the aforementioned manner provides error prevention in the event of, for example, head clog or damage to the tape, such as a scratch. For example, let it be assumed that head B (in FIG. 2 or 4) suffers from head clog. Consequently, and as is apparent from FIG. 9, in an odd frame, data which normally would be reproduced by head B will not be readily detected. That is, macro blocks B0, B1, . . . B26 in all of the sub-areas may not be readily reproduced. However, and as also seen in FIG. 9, in the even frames, head A reproduces macro blocks B0, B1, . . . B26 which, of course, will be accurately recovered. The data from those macro blocks which are not reproduced from an odd frame nevertheless are interpolated from the data which is successfully recovered from the even frame, thereby permitting an acceptable video image to be produced.

Even if the magnetic tape exhibits a longitudinal error, such as a scratch, interpolation similar to that just described can be effected because macro blocks located at different positions in the frame may be erroneous or not properly reproduced, but such errors in video data nevertheless can be filled in by interpolation, thus producing an acceptable video display.

The manner in which video data is recovered during a high speed reproducing operation, that is, during a reproducing operation in which magnetic tape 12 is driven at a speed which is greater than the speed at which the video data had been recorded (such recording speed is referred to herein as the "normal" speed) now will be described. It will be recognized that, when the tape is driven at this higher speed, each magnetic head scans only a portion of each of several record tracks. Hence, only a portion of the data recorded therein can be recovered from each track. Consequently, it is difficult to form a complete frame of an image. However, since video data exhibits good correlation, by setting the tape transport speed to a particular value, a complete frame of an image nevertheless can be formed without introducing significant visual disturbance in the displayed image.

Different tape transport speeds may be used for the magnetic head assemblies shown in FIGS. 2 and 4, and the tape transport speed for each such assembly now will be described.

Figure 11:
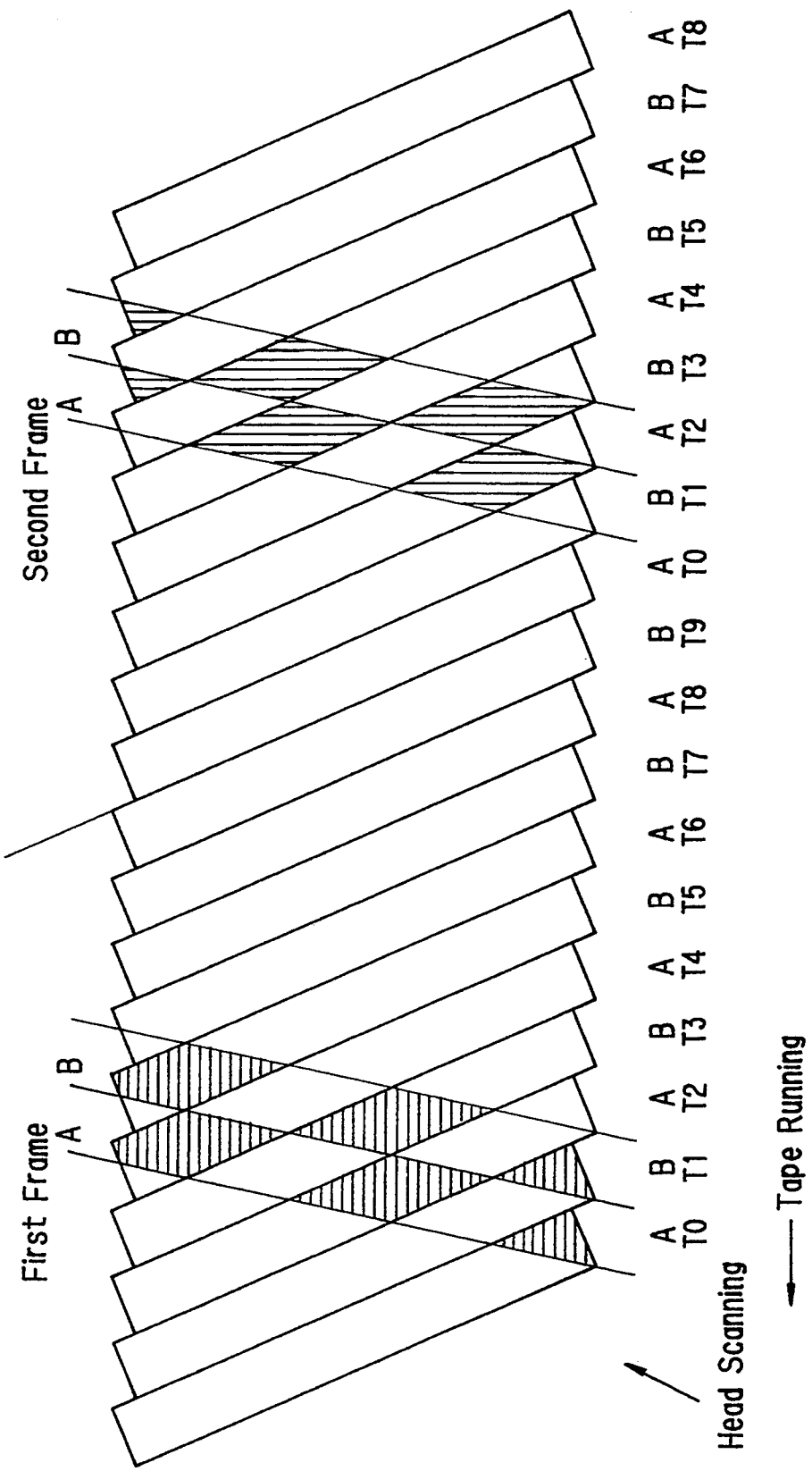
FIG. 11 schematically illustrates the signals which are picked up by the heads of FIG. 4 when scanning a video tape transported at 5.5 times the recording speed.

When the double azimuth head assembly shown in FIG. 4 is used, the tape transport speed for reproducing an NTSC signal at relatively high speeds is $5n\pm 0.5$ times normal speed (wherein n is an integer other than 0). A schematic representation of the relationship between traces scanned by the double azimuth head assembly while the tape is transported at this speed and the previously recorded record tracks is illustrated in FIG. 11. For convenience, the horizontal hatching shown in FIG. 11 represents those portions of tracks A which are picked up by head A and those portions of tracks B which are picked up by head B in a first video frame. By reason of the phenomenon of azimuth loss, the data recorded on tracks B are not picked up by head A when tracks B are scanned thereby and, similarly, the data recorded on tracks A are not picked up by head B. When the double azimuth head assembly scans a succeeding frame, referred to as the second frame, those portions of tracks A which are picked up by head A and those portions of tracks B which are picked up by head B are illustrated by vertical hatching. It will be seen that, during the first scanning operation when the first frame is scanned, head A begins its scanning at track T0 and head B begins its scanning at track T1. At the end of this first scanning operation, head A is positioned over tracks T4 and T5 and head B is positioned over tracks T5 and T6. When the heads begin a second scanning operation, head A is positioned over track T1 and head B is positioned over track T2 in the second frame; and at the end of this second scanning operation, head A is positioned over tracks T5 and T6 and head B is positioned over tracks T6 and T7. Although not shown, when the heads begin a third scanning operation, head A is positioned over track T2 in the third frame and head B is positioned over track T3; and at the end of this third scanning operation, head A is positioned over tracks T6 and T7 and head B is positioned over tracks T7 and T8. Thus, it is seen that, at each successive scan, the tracks over which heads A and B are positioned are advanced by one track pitch from the tracks over which these heads were positioned at the beginning of the previous scan.

Figure 12:
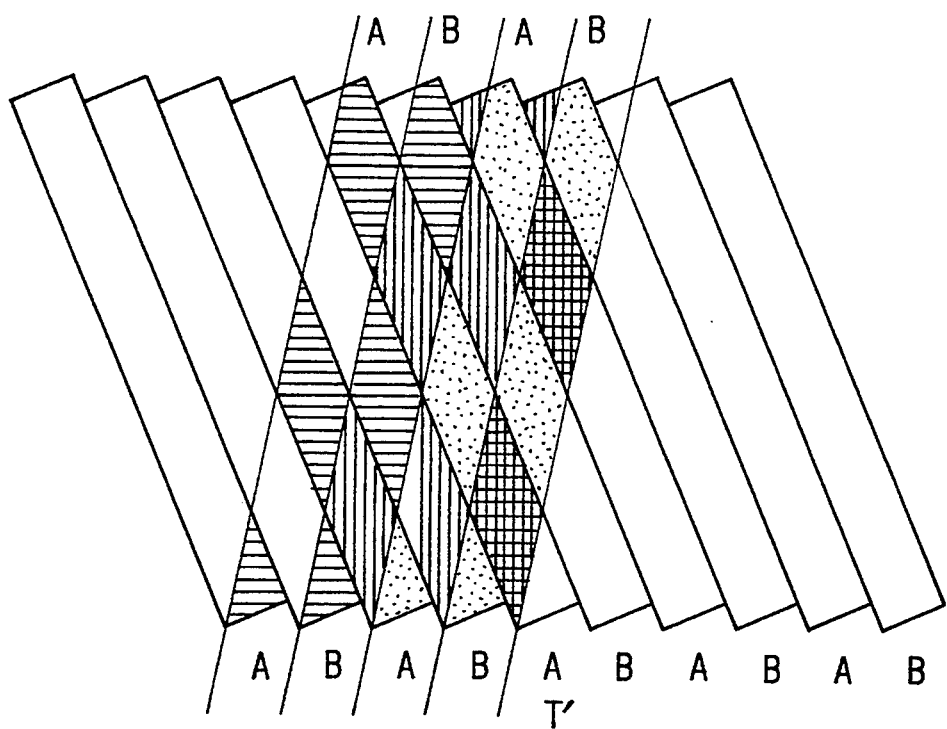
FIG. 12 is a composite reconstruction of the data picked up by the heads during the high speed playback operation shown in FIG. 11.

When those portions of the individual tracks which are recovered by heads A and B in successive frames are assembled so as to emulate a composite record track, the resultant tracks formed by such recovered portions appear as shown in FIG. 12. It is observed that, in each composite track, data recovered from a second frame is linked to data recovered from a first frame, that is, such recovered data portions are adjacent each other. Moreover, and continuing with this linking effect, data recovered from the second frame is linked to data recovered from a third frame which, in turn, is linked to data recovered from a fourth frame. Accordingly, and with reference to an emulated track T' which is formed as a composite of the recovered data portions, the macro blocks which appear in this emulated track T' are a composite assembly of macro blocks recovered by head A from a first frame linked to macro blocks recovered by head B from a second frame linked to macro blocks recovered by head A from a third frame linked to macro blocks recovered by head B from a fourth frame. Since the video signals of successive frames exhibit high correlation, that is, since successive frames of an image are highly correlated, the resultant image which is reproduced from the emulated, composite tracks appears as a natural image. It also will be recognized that adjacent macro blocks in a frame, such as shown in FIGS. 7 and 8A, are recorded in adjacent tracks, as shown in FIG. 9, and are recovered from such adjacent tracks when assembling a composite track which emulates a record track.

The foregoing explanation has assumed a tape transport speed during the reproducing operation equal to 5.5 times the normal speed. A similar effect is achieved if the tape transport speed is equal to 4.5 times the normal speed; although at such speed, successive scans of the double azimuth head assembly appear as a delayed track rather than an advanced track. That is, if head A begins its first scan at track T0 of the first frame, it begins its second scan at track T9 of the first frame.

If the tape transport speed for a reproducing operation is 10.5 times normal speed, the second scan of the double azimuth head assembly begins at the third frame of video data and not, as shown in FIG. 11, at the second frame. Also, if the tape transport speed is −4.5 times normal speed, that is, if a fast reverse reproducing operation is effected, the tracks which are scanned by the double azimuth head assembly at successive scanning operations are advanced by one track relative to the tracks which were scanned in the previous scanning operation. And if the tape transport speed is equal to −5.5 times normal speed, the scanning of tracks by the double azimuth head assembly at successive scans is delayed by one track, similar to the delay produced when the tape transport speed is equal to +4.5 times normal speed.

Figure 13:
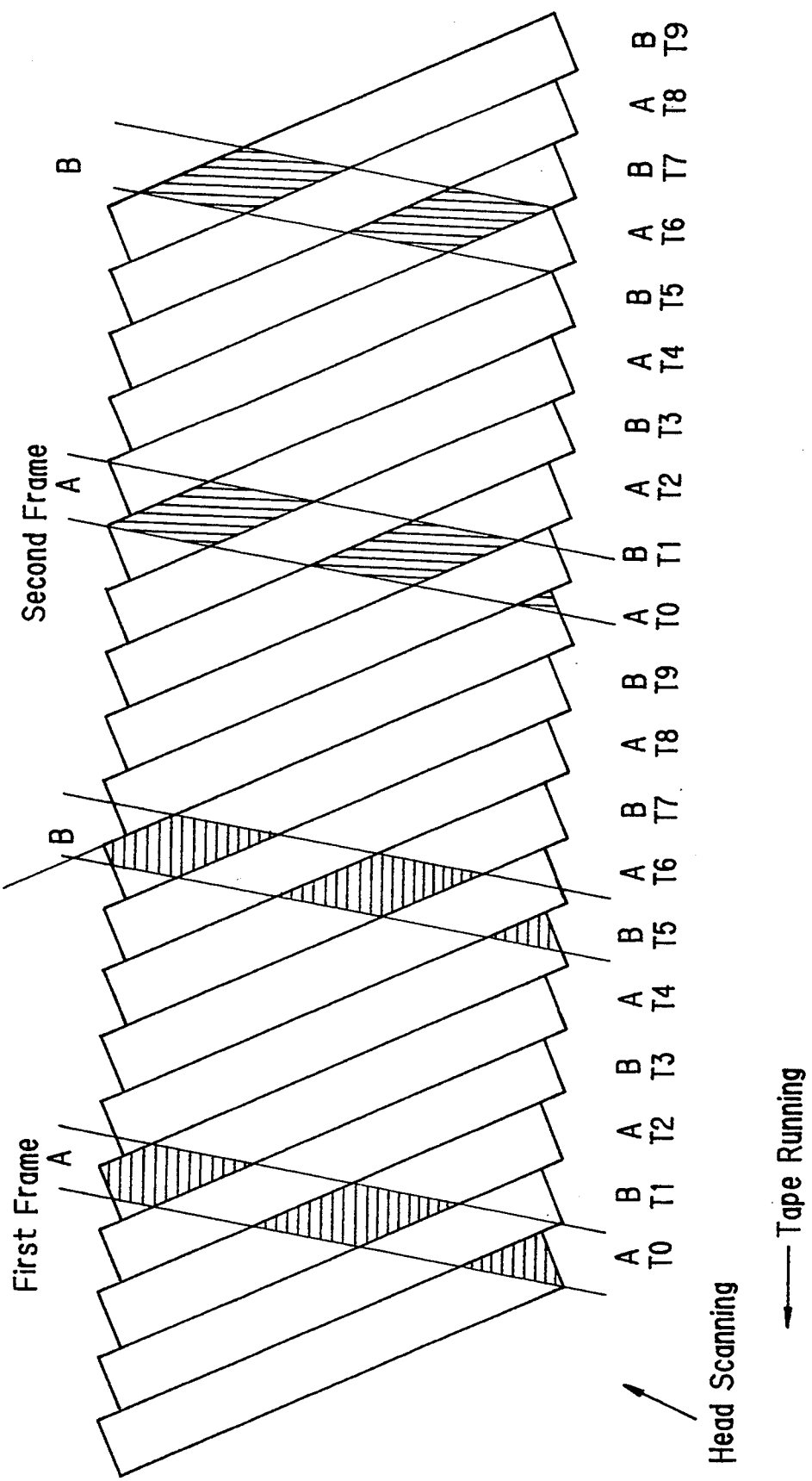
FIG. 13 schematically illustrates the signals which are picked up by the heads of FIG. 2 when scanning a video tape transported at 5.25 times the recording speed.

Let it be assumed that the head assembly shown in FIG. 2, wherein heads A and B are spaced apart by 180°, is used to carry out a high speed reproducing operation for an NTSC signal. When this arrangement is adopted, the magnetic tape is transported at a speed 5.25 times the normal speed to effect a high speed reproducing operation. FIG. 13 schematically illustrates the scanning of the previously recorded record tracks by heads A and B at this high reproducing speed. As was discussed in connection with FIG. 11, horizontal hatched areas represent those portions recovered by heads A and B from tracks A and B, respectively, in a first frame; and vertical hatching represents those portions recovered by heads A and B from tracks A and B, respectively, in a succeeding, second frame.

If head A is positioned at track T0 when it begins its scanning operation in a first frame, this scanning operation ends with head A positioned over tracks T4 and T5. Then, head B begins its scanning operation positioned at tracks T5 and T6 and ends that scanning operation positioned over track T9 of the first frame as well as track T0 of the succeeding, second frame. Then, in the next-following, or second scanning operation of the heads, head A begins its scanning of the second frame positioned over tracks T0 and T1 and ends its scan positioned over tracks T4 and T5. Head B begins its scan positioned over track T6 and ends its scan positioned over tracks T0 and T1 in the third frame (not shown). When the head assembly begins its third scanning operation, head A begins its scan positioned over track T1 in the third frame and ends its scan positioned over tracks T5 and T6. Thus, it is appreciated that, at every third scanning operation, the tracks which are scanned by the 180° spaced-apart heads are advanced by one track. That is, if head A, for example, begins its scanning operation of the first frame at track T0, this same head begins its scanning operation at track T1 of the third frame.

Figure 14:
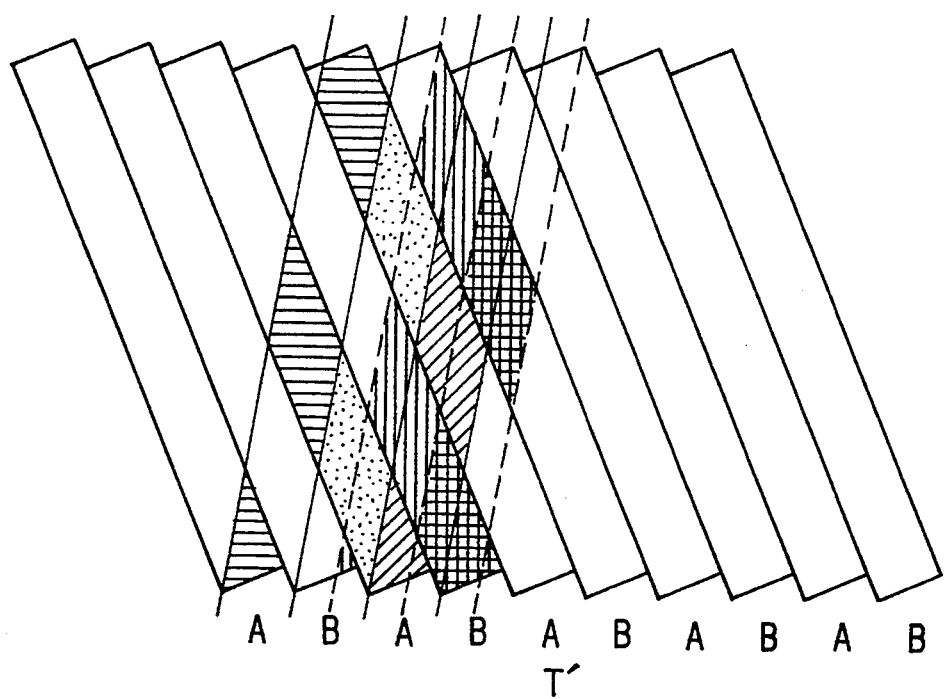
FIG. 14 is a composite reconstruction of the data picked up by the heads during the high speed playback operation shown in FIG. 13.

When those portions of the respective tracks which are picked up by heads A and B are assembled to form a composite which emulates the record tracks, the resultant composite appears as shown in FIG. 14 It is seen that emulated track T' as an example, is formed from data picked up by, for example, head A from a portion of the track scanned thereby in the first frame, and this data is linked to data picked up by head A when scanning a track in the third frame, and this data is linked to data picked up by head A when scanning a track in the fifth frame. Although not shown, it will be appreciated that the remaining data in emulated track T' is picked up by head A when the head scans the seventh frame and, possibly, when the head scans the ninth frame. Thus, one emulated track is formed as a composite of data picked up from tracks scanned in successive odd frames and the next adjacent track is formed as a composite from data which is picked up from the scanning of tracks in successive even frames.

In the present arrangement wherein the head assembly is formed of 180° spaced-apart heads, macro blocks which are adjacent each other in a frame, as shown in FIGS. 7 and 8A, and are recorded in adjacent tracks, as shown in FIG. 9, are recovered from such adjacent tracks, similar to the arrangement wherein the double azimuth head assembly is used to perform the high speed reproducing operation.

The foregoing has assumed a tape transport speed equal to 5.25 times the normal speed. Similar composite tracks are formed when the tape is transported at a speed equal to 4.75 times the normal speed. At such speed, however, the track scanned by a magnetic head is delayed by one track at every third scanning operation. Hence, and with reference to the schematic representation shown in FIG. 13, whereas head A begins its scanning in the first frame at track T0 and begins its scanning of the third frame at track T1; when the tape transport speed is equal to 4.75 times the normal speed head A begins its scanning of the first frame at track T0 and begins its scanning of the third frame at track T9 of the preceding, or second frame.

The foregoing operation has been described wherein n=1. However, if n is an even number, for example, if the magnetic tape is transported at a speed equal to 10.25 times normal speed, it will be appreciated that the heads begin their scanning operation at the very same track every third scanning operation. Hence, the data reproduced from the scanned tracks, when assembled in composite form, will not be linked. But, when n is an odd number, the heads begin their scanning operation at every third scan at a track which is advanced or delayed by one track pitch. Consequently, a composite track will be formed of reproduced data which is linked.

Figure 15:
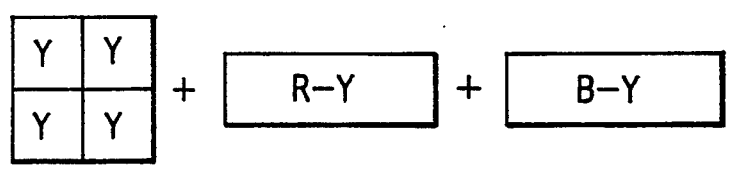
FIGS. 15A-15C schematically illustrate the manner in which blocks of picture elements of a PAL video signal are formed of samples which constitute a frame of a PAL video image.

The foregoing has described the operation of high speed reproduction wherein the recorded video data is derived from an NTSC video signal and the macro blocks which are formed of luminance and color difference data blocks exhibit the 4:1:1 relation. Referring to FIG. 15A, there is illustrated the manner in which the digital video samples of the luminance component Y are arranged into data blocks when the video signal conforms with the PAL standard. In a PAL frame, 720 samples in a horizontal line and 576 samples in the vertical direction are provided. It is appreciated, then, that an array of 90×72 data blocks constitute a frame of PAL luminance samples.

As was the case in the NTSC format, a red color difference component R-Y and a blue color difference component B-Y accompany the luminance component Y of the video signal. Typically, and as has been mentioned above, the number of samples of the color difference component is one-fourth the number of samples of the luminance component. FIG. 15B illustrates the data blocks of R-Y and B-Y samples, each data block being comprised of an 8×8 array, and the number of data blocks included in a frame is seen to be a 45×36 array of color difference data blocks. That is, the blocks of color difference samples are arranged in 36 rows of color difference data blocks, with each row consisting of 45 color difference data blocks.

FIG. 15C illustrates the construction of a macro block which is formed of four luminance data blocks, one R-Y data block and one B-Y data block. In the PAL format, this construction is known as the 4:2:0 arrangement.

As was the case when describing the NTSC format, each luminance and color difference data block in the PAL format is subjected to orthogonal transformation, quantization, variable encoding, framing, and the remaining processing discussed above in connection with FIG. 1.

Figure 16:
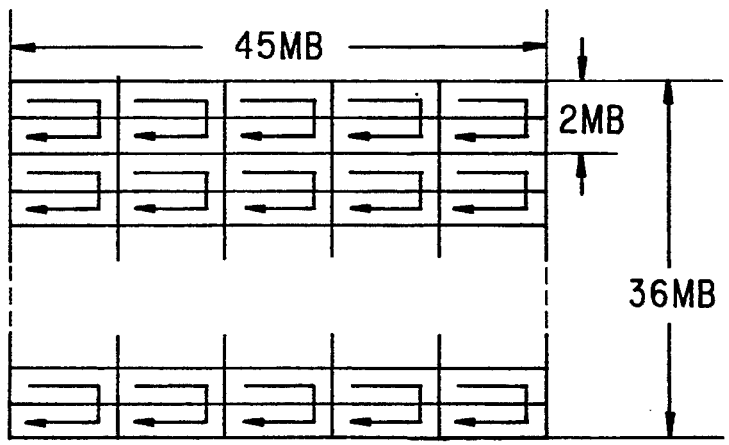
FIGS. 16A-16C illustrate the manner in which the macro blocks formed of the blocks shown in FIGS. 15A-15C are shuffled for recording.

FIG. 16A illustrates a frame of macro blocks formed of a 45×36 array of the macro blocks similar to that shown in FIG. 15B. A group of macro blocks consisting of, for example, 18 macro blocks, is selected for shuffling; and as is seen in FIG. 16A, this group is formed of a 9×2 array. Let it be assumed that the group of 18 macro blocks in the upper left-hand corner of FIG. 16A consists of macro blocks A0, B0, ... A8, B8. Consistent herewith, a group of 18 macro blocks immediately below the first-mentioned group consists of macro blocks A9, B9, ... A17, B17. A third group of 18 macro blocks immediately below the aforementioned second group consists of macro blocks A18, B18, ... A26, B26. FIG. 16B illustrates a set of these three groups of macro blocks A0–B26, formed of 54 macro blocks. Although not shown, it will be appreciated that another set of 54 macro blocks vertically disposed beneath the set shown in FIGS. 16A and 16B may be selected, and a total of six sets of macro blocks, each set being formed of a 9×6 array (as shown in FIG. 16B) constitute one column of the macro blocks shown in FIG. 16C. Another column formed of six sets of macro blocks, each set consisting of a 9×6 array similar to that shown in FIG. 16B, is adjacent the first-mentioned column, and a total of five columns, each column being formed of six sets and each set consisting of a 9×6 array of macro blocks thus constitutes the frame shown in FIG. 16A.

FIG. 16C illustrates the aforementioned five columns of macro blocks, and each set in each column is identified by a respective sub-area identifier 0, 2, 4, 6, 8 or 10. These sub-area identifiers, arranged in the order shown in FIG. 16C, thus identify each sub-area formed of a 9×6 array of macro blocks. It is appreciated that FIG. 16C is similar to FIG. 8C.

Now, the macro blocks included in the sub-areas shown in FIG. 16C are recorded in successive tracks in odd and even frames, as shown in FIG. 17. The manner in which the macro blocks are recorded is similar to the recording of macro blocks in the successive tracks of FIG. 9. Each track of FIG. 17 is divided into 27 portions, and each portion has recorded therein those macro blocks in each sub-area identified by the same sub-area identifier and limited to similarly identified macro blocks. For example, each sub-area in FIG. 16C includes macro blocks A0–B26. That is, each sub-area identified by identifier 0 contains macro blocks A0–B26. Likewise, each sub-area identified by identifier 2 contains macro blocks A0–B26. In FIG. 17, for those tracks included in an odd frame, the first track A includes all of the macro blocks A0, A1, ... A26 included in all of the sub-areas identified by identifier 0. The first track B includes wherein all of the macro blocks B0, B1, ... B26 included in each sub-area identified by identifier 0. The second track A includes therein macro blocks A0, A1, ... A26 included in each sub-area identified by identifier 2. The remaining tracks B, A, B, A, ... B are similarly formed.

In addition, and as has been described above in conjunction with FIG. 9, the macro blocks which are recorded in each portion of each track, for example, in portion 0-A0 of track A, are selected as follows: first, macro block A0 (or B0) from sub-area 0 included in the central column shown in FIG. 16C, followed by macro block A0 included in sub-area 0 to the right of the central column, followed by macro block A0 included in sub-area 0 to the left of the central column, followed by macro block A0 included in the right-most sub-area 0 followed by macro block A0 included in the left-most sub-area 0. This order of recording macro blocks in a track is repeated for macro blocks A1, A2, ... A26 recorded in portions 0-A1, 0-A2, ... 0-A26, respectively.

In similar fashion, in the next adjacent track B in the odd frame, macro blocks B0 from each of sub-area 0 are recorded in the following order: first from sub-area 0 in the central column, then from sub-area 0 in the adjacent right column, then from sub-area 0 in the adjacent left column, then from sub-area 0 in the right-most column, then from sub-area 0 in the left-most column. As a result, the twelve tracks which constitute a frame in the PAL format are recorded with macro blocks as illustrated in FIG. 17.

When the PAL video data recorded in the tracks of FIG. 17 are reproduced by driving the magnetic tape at a high transport speed, one image frame may be displayed as a natural display if the transport speed is restricted as follows: if the video data is reproduced by a double azimuth head assembly, such as shown in FIG. 4, the tape transport speed should be $6n \pm 0.5$ times normal speed, wherein n is an integer other than 0. If the video data is reproduced by heads which are spaced apart by 180°, as shown in FIG. 2, the tape transport speed should be $6n \pm 0.25$ times normal speed, wherein n is an odd integer and may be positive or negative, depending upon whether the tape is transported in the forward or reverse direction. The reason for displaying an image which appears natural when the tape is transported at the aforementioned speeds is similar to the reason discussed hereinabove in detail in connection with the high speed reproduction of NTSC data; and in the interest of brevity, that explanation is not repeated here.

Thus, it will be seen that, when a frame of video data is recorded in 2 m tracks (m=5 for the recording of NTSC, m=6 for the recording of PAL data and m=10 for the recording of HDTV data), it is desirable to transport the magnetic tape at a transport speed $m \times n \pm 0.5$ or $m \times n \pm 0.25$, depending upon whether the video data is reproduced by a double azimuth head assembly or by heads which are spaced apart by 180°.

If, however, the read-out rate of the data recovered from the tracks shown in, for example, FIGS. 9 or 17 during a high speed reproducing operation is relatively low, for example, less than 50%, then the composite tracks which are emulated by reproducing data from only portions of tracks, such as shown in FIGS. 12 and 14, may include data which is not linked. For example, let it be assumed that the tracks shown in FIG. 11 are reproduced at a tape transport speed that is 5.5 times normal speed by a double azimuth head assembly; but let it be further assumed that the read-out rate of the reproduced data is about 35%. Because of this low read-out rate, the composite tracks which are emulated do not appear as shown in FIG. 12 but, rather, the data recovered from successive frames and assembled in an emulated track are spaced apart from each other, such as shown in FIG. 18. Emulated track T' in FIG. 12 corresponds to emulated track T' in FIG. 18. However, whereas data recovered from successive frames appear in areas which abut each other in track T' of FIG. 12, those same areas are seen to be spaced from each other in track T' in FIG. 18. The spacings between such areas in which data from successive frames are assembled is seen to be triangular in shape. Examples of these triangles are shown as triangles a, b, c, d and e.

However, as the data read-out rate improves, triangles a-e appear smaller; and if the data read-out rate is on the order of, for example, 50%, the triangles are sufficiently small such that the successive areas in, for example, track T' which include data recovered from successive frames abut each other. That is, when the data read-out rate is on the order of about 50% (or greater), the data recovered from portions of tracks in different frames are linked and more closely resemble the linked data shown in FIG. 12. However, if the data read-out rate is less than 50%, it is likely that the data recovered from different tracks in successive frames are not linked.

The foregoing explanation, although presented for a tape transport speed of 5.0±0.5 times normal speed is equally applicable to a tape transport speed of 5n±0.5 times normal speed for an NTSC video signal and for a transport speed 6n±0.5 times normal speed for a PAL video signal. Also, the foregoing has described the high speed reproducing operation using a double azimuth head assembly. If a similar high speed reproducing operation is carried out with heads that are spaced apart by 180°, then the same problem occurs even if the tape is transported at a speed of 5n±0.5 times normal speed (n is an odd number) for an NTSC signal or for a tape transport speed of 6n±0.25 times normal speed (where n is an odd number) for a PAL video signal. But, if the data read-out rate is less than 50%, then the tape transport speed is established in accordance with another relationship, thereby assuring the display of a natural-looking image for a high speed reproducing operation. This is achieved by transporting the tape upon which NTSC video signals have been recorded at a speed 5n±0.25 times normal speed if the video data is reproduced by a double azimuth head assembly; and by transporting the tape at 5n±0.125 times normal speed (wherein n is an odd number) if the video data is reproduced by heads which are spaced apart by 180°. Similarly, if a high speed reproducing operation of PAL video data is carried out at a data read-out rate less than 50%, the tape is transported at 6n±0.25 times normal speed (wherein n is an odd integer) when a double azimuth head assembly is used; and the tape is transported at 6n±0.125 times normal speed (wherein n is an odd number) when the heads are spaced apart by 180°. When the aforementioned tape transport speeds are selected, a natural-looking image may be displayed even if the data read-out rate is as low as 25%.

Let it be assumed that NTSC video data is reproduced at a high-speed reproducing operation by a double azimuth head assembly and that the data read-out rate is on the order of about 35%. Accordingly, the magnetic tape is transported at a speed 5.25 times normal speed. At this speed, it will be appreciated that a track scanned by a head is advanced by ½ track pitch at each successive scanning operation. Consequently, and as shown in FIG. 19, the data which is recovered from those portions of the respective tracks in successive frames will appear as a composite assembly emulating the recording tracks. Indeed, it is seen from, for example, emulated track T', that a portion of the data which is recovered from a track scanned in the first frame overlaps with a portion of the data recovered from a track scanned in the second frame; and this data overlaps with a portion of the data reproduced from a track scanned in the third frame. That is, the composite video data which is assembled in emulated track T' is seen to be linked from frame to frame and also to be partially overlapped from frame to frame. The use of time delays in the reproducing channels may be used to compensate for such overlapping as by repeating a previously recovered portion in place of a newly recovered portion.

If the head assembly used in the high speed reproducing operation of NTSC data is formed of 180° spaced-apart heads, the magnetic tape is transported at a speed 5.125 times normal speed. Once again, if it is assumed that the data read-out rate is on the order of about 35%, a composite assembly of the data which is reproduced from portions of tracks in successive frames appears as shown in FIG. 20. Consistent with the foregoing discussion, reference is made to emulated track T' which is formed of the composite assembly of data reproduced from portions of tracks included in successive frames. It is seen that the composite assembly of FIG. 20 is similar to that shown in FIG. 14, except that, in FIG. 20, the data which is reproduced from a track in the first frame is linked to and overlaps with data which is reproduced from a track in the third frame and this, in turn, is linked to and overlaps with data which is reproduced from a track in the fifth frame.

At the tape transport speed of 5.125 times normal speed, the track scanned by a head is advanced by one track pitch at every third scanning operation, and this is similar to the operation discussed hereinabove in conjunction with FIG. 13. Thus, in an emulated track, data recovered from tracks in every other frame are linked In emulated track T', data recovered from tracks in the odd frames are linked, and in an emulated track adjacent track T'data recovered from tracks in even frames are linked.

While the foregoing operation discussed with reference to FIGS. 19 and 20 is based upon the reproduction of NTSC video data, it will be appreciated that the same results obtain when PAL video data is reproduced at higher speeds. Thus, to display a natural-looking image, the tape is transported at a speed equal to 6n±0.25 times normal speed when a double azimuth head assembly is used; and the tape is transported at a speed equal to 6n±0.125 times normal speed (n is an odd number) when the head assembly is comprised of heads which are spaced apart by 180°.

From the foregoing discussion, it is seen that, in accordance with the present invention, a natural-looking image is displayed during a high speed reproducing operation if the tape transport speed is equal to m×n±0.5 times normal speed if the head assembly used to recover the video data is a double azimuth head assembly if the data read-out rate is not less than 50% and the tape transport speed is equal to m×n±0.25 times normal speed if the data read-out rate is less than 50%, wherein n is an integer other than 0 and a frame of video data is recorded in 2 m tracks (m=5 for an NTSC signal and m=6 for a PAL signal).

Moreover, when data is recovered by a head assembly formed of heads which are spaced apart by 180°, then the tape transport speed is equal to m×n±0.25 times normal speed when the data read-out rate is not less than 50%, and the tape transport speed is equal to m×n±0.125 times normal speed when the data read-out rate is less than 50%; wherein n is an odd number.

While the present invention has been particularly shown and described with reference to preferred embodiments, it will be readily appreciated by those of ordinary skill in the art that various changes may be made without departing from the spirit and scope of the invention. It is intended that the appended claims be interpreted as including the embodiments specifically described herein, modifications which have been mentioned above and all equivalents thereto.

What is claimed is:

1. Apparatus for reproducing digital video signals from a magnetic tape, wherein a frame of digital video signals had been recorded in 2 m tracks (m is an integer greater than 1) when said magnetic tape was transported at a first speed, comprising: a pair of rotary heads having respectively different azimuth angles for scanning traces across said magnetic tape, said heads being constructed either as a double azimuth head assembly or as a pair of heads angularly separated by 180°, said traces substantially coinciding with said tracks when said magnetic tape is transported at said first speed; and tape transport means for transporting said magnetic tape at a second speed equal to (m×n±l) times said first speed, where n is an integer other than zero, l=0.5 when said pair of heads comprise said double azimuth head assembly and l=0.25 when said heads are angularly separated by 180°.

2. The apparatus of claim 1 wherein n is a positive number when said tape transport means transports said magnetic tape in a forward direction and n is a negative number when said tape transport means transports said magnetic tape in a reverse direction.

3. The apparatus of claim 1 wherein said digital video signals are NTSC video signals and m=5.

4. The apparatus of claim 1 wherein said digital video signals are PAL video signals and m=6.

5. The apparatus of claim 1 wherein n is an odd integer when l=0.25.

6. The apparatus of claim 1 wherein the frame of digital video signals recorded in said 2 m tracks are orthogonally transformed video signals encoded in variable length code.

7. The apparatus of claim 6 wherein said variable length code is a two-dimension Huffman code.

8. The apparatus of claim 6 wherein the orthogonally transformed video signals of a frame are shuffled.

9. Apparatus for reproducing digital video signals from a magnetic tape, wherein a frame of digital video signals had been recorded in 2 m tracks (m is an integer greater than 1) when said magnetic tape was transported at a first speed, each frame having been divided into blocks of picture elements and the blocks of a frame having been recorded in shuffled form with respect to each other, said apparatus exhibiting a data read-out rate and comprising: a pair of rotary heads angularly separated from each other by 180° and admitting of respectively different azimuth angles; and tape transport means for transporting said magnetic tape at a second speed equal to (m×n±l) times said first speed, where n is an odd integer, l=0.25 when said apparatus exhibits a data read-out rate determined to be at least 50% and l=0.125 when said apparatus exhibits a data read-out rate determined to be less than 50%.

10. The apparatus of claim 9 wherein n is a positive number when said tape transport means transports said magnetic tape in a forward direction and n is a negative number when said tape transport means transports said magnetic tape in a reverse direction.

11. The apparatus of claim 9 wherein said digital video signals are NTSC signals and m=5.

12. The apparatus of claim 9 wherein said digital video signals are PAL signals and m=6.

13. The apparatus of claim 9 wherein the frame of digital video signals recorded in said 2 m tracks are orthogonally transformed video signals encoded in variable length code.

14. The apparatus of claim 13 wherein said variable length code is a two-dimension Huffman code.

15. Apparatus for reproducing digital video signals from a magnetic tape, wherein a frame of digital video signals had been recorded in 2 m tracks (m is an integer greater than 1) when said magnetic tape was transported at a recording speed, each frame having been divided into blocks of picture elements and the blocks of a frame having been recorded in shuffled form with respect to each other, said apparatus exhibiting a data read-out rate and comprising: a pair of rotary magnetic heads disposed in a double azimuth head assembly and admitting of respectively different azimuth angles; and tape transport means for transporting said magnetic tape at a fast playback speed equal to (m×n±l) times said recording speed, where n is an integer other than zero, l=0.5 when said apparatus exhibits a data read-out rate determined to be at least 50% and l=0.25 when said apparatus exhibits data read-out rate determined to be less than 50%.

16. The apparatus of claim 15 wherein n is a positive number when said tape transport means transports said magnetic tape in a forward direction and n is a negative number when said transport means transports said magnetic tape in a reverse direction.

17. The apparatus of claim 15 wherein said digital video signals are NTSC signals and m=5.

18. The apparatus of claim 15 wherein said digital video signals are PAL signals and m=6.

19. The apparatus of claim 15 wherein the frame of digital video signals recorded in said 2 m tracks are orthogonally transformed video signals encoded in variable length code.

20. The apparatus of claim 19 wherein said variable length code is a two-dimension Huffman code.

* * * * *